(12) United States Patent
Lee et al.

(10) Patent No.: US 9,395,512 B2
(45) Date of Patent: Jul. 19, 2016

(54) AUTO FOCUS DEVICE AND A METHOD THEREFOR

(75) Inventors: Ilyong Lee, Gwacheon (KR); Jungho Ahn, Seoul (KR); Yunpyo Hong, Seoul (KR); Sunghyun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 664 days.

(21) Appl. No.: 13/809,955

(22) PCT Filed: Jul. 14, 2010

(86) PCT No.: PCT/KR2010/004583
§ 371 (c)(1),
(2), (4) Date: Jan. 14, 2013

(87) PCT Pub. No.: WO2012/008630
PCT Pub. Date: Jan. 19, 2012

(65) Prior Publication Data
US 2013/0114154 A1 May 9, 2013

(51) Int. Cl.
G03B 13/36 (2006.01)
H04N 5/232 (2006.01)
G02B 7/09 (2006.01)
G02B 7/36 (2006.01)

(52) U.S. Cl.
CPC .. *G02B 7/09* (2013.01); *G02B 7/36* (2013.01); *G03B 13/36* (2013.01); *H04N 5/23212* (2013.01); *H04N 5/23216* (2013.01)

(58) Field of Classification Search
CPC ............ G03B 13/36; G02B 7/09; G02B 7/36; G02B 7/38; H04N 5/23212
See application file for complete search history.

(56) References Cited

U.S. PATENT DOCUMENTS

| 6,337,928 | B1 | 1/2002 | Takahashi et al. |
| 6,430,368 | B1 | 8/2002 | Hata |
| 7,079,763 | B2 * | 7/2006 | Hirai ............................ 396/91 |

(Continued)

FOREIGN PATENT DOCUMENTS

| CN | 1506744 A | 6/2004 |
| CN | 101112079 | 1/2008 |

(Continued)

OTHER PUBLICATIONS

European Search Report dated Jul. 10, 2014 issued in Application No. 10 854 752.2.

(Continued)

*Primary Examiner* — W B Perkey
(74) *Attorney, Agent, or Firm* — Ked & Associates, LLP

(57) ABSTRACT

The present invention relates to an autofocus device, and to a method therefor, whereby the delay necessary for auto focus can be reduced according to circumstances and a clear image of a subject can be obtained in a timely fashion by suitably adjusting the precision and speed of autofocus, as auto focus settings are differently applied in accordance with the photography mode when autofocus is being implemented in a camera. To this end, the autofocus method according to an embodiment of the present invention comprises: a step of inputting a photography mode for a subject; a step of deciding which auto focus setting corresponds to the input photography mode; a step of determining the lens step with the highest focal value among lens steps set according to the distance of the subject and the lens on the basis of the auto focus setting decided upon; and a step of moving the lens to the determined lens step.

20 Claims, 9 Drawing Sheets

(56) References Cited

U.S. PATENT DOCUMENTS

| | | | |
|---|---|---|---|
| 2004/0146291 A1 | 7/2004 | Ogino | 396/101 |
| 2006/0203118 A1* | 9/2006 | Hirai | 348/345 |
| 2007/0181687 A1* | 8/2007 | Fukushima et al. | 235/454 |
| 2008/0080848 A1* | 4/2008 | Tsai | 396/127 |
| 2009/0185068 A1* | 7/2009 | Iwasaki | 348/345 |
| 2011/0292272 A1* | 12/2011 | Terashima et al. | 348/345 |
| 2011/0293256 A1* | 12/2011 | Ishiwata et al. | 396/104 |
| 2011/0305446 A1* | 12/2011 | Itoh | 396/95 |
| 2012/0105710 A1* | 5/2012 | Itoh et al. | 348/345 |
| 2013/0114154 A1* | 5/2013 | Lee et al. | 359/823 |

FOREIGN PATENT DOCUMENTS

| | | |
|---|---|---|
| EP | 1 079 601 A1 | 2/2001 |
| EP | 1 494 464 A2 | 5/2005 |
| JP | 2004-085964 A | 3/2004 |
| JP | 2007-148249 A | 6/2007 |
| JP | 2009-031702 A | 2/2009 |
| WO | WO 2006/080562 A2 | 8/2006 |

OTHER PUBLICATIONS

International Search Report dated Apr. 29, 2011 issued in Application No. PCT/KR2010/004583.

European Office Action dated Jan. 18, 2016 issued in Application No. 10854752.2.

Chinese Office Action dated Jan. 22, 2016 issued in Application No. 201080068048.6 (English Translation attached).

* cited by examiner

AUTO FOCUS DEVICE AND A METHOD THEREFOR

CROSS-REFERENCE TO RELATED PATENT APPLICATIONS

This application is a U.S. National Stage Application under 35 U.S.C. §371 of PCT Application No. PCT/KR2010/004583 filed Jul. 14, 2010.

TECHNICAL FIELD

The present disclosure relates to an autofocus device and method, and more particularly, a device for automatically adjusting a focus to obtain a sharp or clear image for a subject (or object to be taken) and an autofocus method in the device.

BACKGROUND ART

In general, a camera includes a lens for capturing (forming) an image of an object or subject onto an image sensor, and an image sensor for detecting the image formed by the lens as an electric signal. A focal point of the lens changes depending on a distance between the lens and the object. An image with superior quality is able to be captured only when a variation of a position of an image surface based on a position of the object is within a range of a focal depth (depth of focus) of the camera. Hence, a typical camera requires for a function for automatically adjusting a focal point according to the change in a distance from an object, namely, an autofocus (AF) function, to obtain an image with excellent quality.

Most of digital cameras use a through-the-lens (TTL) contrast detection. The contrast detection is to continuously calculate a contrast of a part (usually, a central portion) of an image while moving a lens, and determine to be focused when the highest contrast is calculated. Therefore, an autofocus function aims to obtaining the sharpest image at a lens step with the highest focal value by analyzing lens steps, which are set according to a distance between the lens and an object or subject and are units for moving a position of the lens, and focal values, each of which is converted into a numeral value from high frequency image signal information, for example, based on characteristic information (for example, sharpness information) relating to an image which is formed on an image sensor at each lens step.

A representative of the autofocus algorithm is hill climbing. The hill climbing type autofocus algorithm is a method of moving a lens from a current position to front and rear sides by a unit of a lens step and thereafter moving a focal lens in a direction to be focused so as to find an optimal focal position.

To focus on an object according to the hill climbing method, the focal lens is moved by each lens step to detect focal values, and then is located on the lens step with the highest focal value. Accordingly, an autofocus time increases as long as the number of steps. This may cause a delay by the autofocus execution time during capturing of an image, resulting in impossibility of obtaining a sharp image for the object in the right place at the right time.

DISCLOSURE OF THE INVENTION

To achieve these and other advantages and in accordance with the purpose of the present invention, as embodied and broadly described herein, there is provided an autofocus method including receiving an object capturing mode, determining an autofocus setting corresponding to the input capturing mode, deciding a lens step with the highest focal value among lens steps based on the determined autofocus setting, the lens steps being set according to a distance between a lens and the object, and moving the lens to the decided lens step.

In accordance with the preferred embodiment, the deciding of the lens step having the highest focal value among the lens steps may include dividing the lens steps into the number of areas corresponding to the determined autofocus setting, deciding a first area including the lens step with the highest focal value among the divided areas, and deciding the lens step with the highest focal value in the first area.

In accordance with the preferred embodiment, the deciding of the first area may include comparing focal values corresponding to at least one lens step included in each of the divided areas, and deciding the first area based on the comparison result.

In accordance with the preferred embodiment, the deciding of the lens step with the highest focal value within the first area may include checking a threshold value corresponding to the determined autofocus setting, deciding a second area including the lens step with the highest focal value within the first area based on the threshold value, and deciding a lens step with the highest focal value within the second area.

In accordance with the preferred embodiment, the deciding of the lens step with the highest focal value within the second area may be a step of deciding the lens step having the highest focal value using one of a global search, a trend prediction approach, a rule based AF, a training-based method, a focal value training-based AF and a blur training-based method, based on the determined autofocus setting.

In accordance with the preferred embodiment, the threshold value may be a preset value such that the lens steps included in the second area and focal values corresponding to the lens steps included in the second area meet a quadratic function.

In accordance with the preferred embodiment, the threshold value may be a constant.

In accordance with the preferred embodiment, the threshold value may be a predetermined angle or inclination.

In accordance with the preferred embodiment, the autofocus method may further include, prior to determining of the autofocus setting, receiving an autofocus trigger signal.

To achieve these and other advantages and in accordance with the purpose of the present invention, as embodied and broadly described herein, there is provided an autofocus device including an input unit to receive an object capturing mode, a setting controller to determine an autofocus setting corresponding to the input capturing mode, an autofocus controlling unit to decide a lens step with the highest focal value among lens steps based on the determined autofocus setting, the lens steps being set according to a distance between a lens and the object, and a lens controller to move the lens to the decided lens step.

In accordance with the preferred embodiment, the autofocus controlling unit may be configured to divide the lens steps into the number of areas corresponding to the determined autofocus setting, decide a first area including a lens step with the highest focal value among the divided areas, and decide a lens step with the highest focal value within the first area.

In accordance with the preferred embodiment, the autofocus controlling unit may be configured to compare focal values corresponding to at least one lens step included in each of the divided areas, and decide the first area based on the comparison result.

In accordance with the preferred embodiment, the autofocus controlling unit may be configured to check the threshold value corresponding to the determined autofocus setting, decide a second area including a lens step with the highest focal value within the first area based on the threshold value, and decide a lens step having the highest focal value within the second area.

In accordance with the preferred embodiment, the autofocus controlling unit may be configured to decide the lens step with the highest focal value using one of a global search, a trend prediction approach, a rule based AF, a training-based method, a focal value training-based AF and a blur training-based method, based on the determined autofocus setting.

In accordance with the preferred embodiment, the threshold value may be a preset value such that the lens steps included in the second area and focal values corresponding to the lens steps included in the second area meet a quadratic function.

In accordance with the preferred embodiment, the threshold value may be a constant.

In accordance with the preferred embodiment, the threshold value may be a predetermined angle or inclination.

In accordance with the preferred embodiment, the input unit may be configured to receive an autofocus trigger signal.

Advantageous Effect

In accordance with one exemplary embodiment of the present disclosure, a camera may be provided with a function of appropriately adjusting precision and speed of an autofocus according to a capturing mode, which may allow a user to obtain a stable image of a static object or fast obtain a dynamic image according to circumstances when capturing the object. This may result in maximization of usability of an autofocus function and reduction of time-based costs consumed during capturing due to a duplicate capturing of the same object.

MODES FOR CARRYING OUT THE PREFERRED EMBODIMENTS

Embodiments of the present invention will be described below in detail with reference to the accompanying drawings where those components are rendered the same reference number that are the same or are in correspondence, regardless of the figure number, and redundant explanations are omitted. In describing the present invention, if a detailed explanation for a related known function or construction is considered to unnecessarily divert the gist of the present invention, such explanation has been omitted but would be understood by those skilled in the art. The accompanying drawings are used to help easily understood the technical idea of the present invention and it should be understood that the idea of the present invention is not limited by the accompanying drawings. The idea of the present invention should be construed to extend to any alterations, equivalents and substitutes besides the accompanying drawings.

Hereinafter, description will be given in detail of an autofocus device and method in accordance with the preferred exemplary embodiments with reference to FIGS. 1 to 16.

Figure 1:
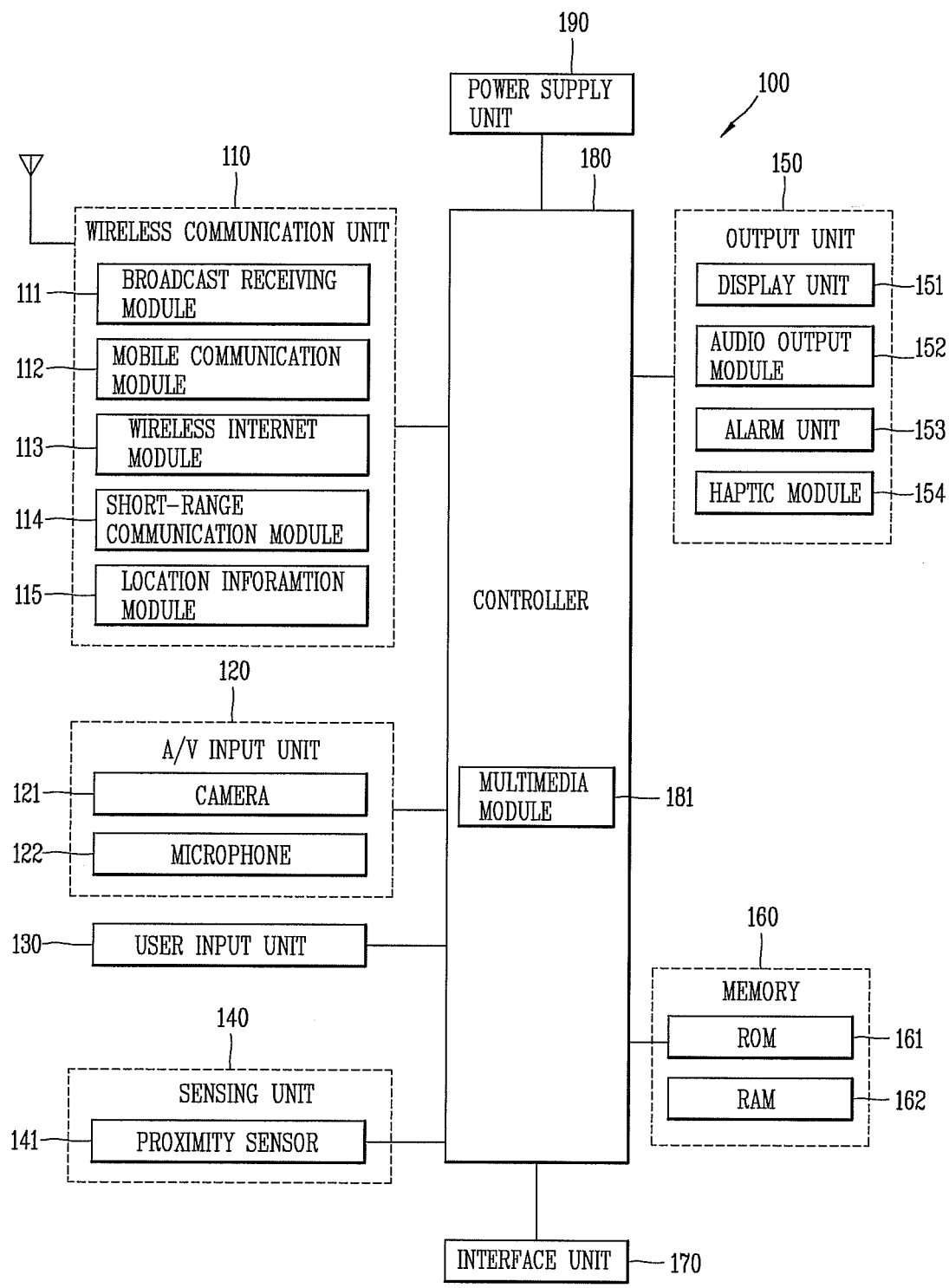
FIG. 1 is a block diagram of a mobile terminal having an autofocus device in accordance with one exemplary embodiment.

FIG. 1 is a block diagram of a mobile terminal having an autofocus device in accordance with one exemplary embodiment. In accordance with the one exemplary embodiment, the mobile terminal 100 may comprise components, such as a wireless communication unit 110, an Audio/Video (A/V) input unit 120, a user input unit 130, a sensing unit 140, an output unit 150, a memory 160, an interface unit 170, a controller 180, a power supply 190 and the like.

The wireless communication unit 110 may execute modulation/demodulation and coding/decoding operations of signals which the mobile terminal 100 transmits to and receives from a base station of a wireless communication system such that the mobile terminal 100 can perform communication with other terminals via the wireless communication system. The wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel.

The broadcast channel may include a satellite channel and/or a terrestrial channel. The broadcast management server may mean a server that generates and transmits a broadcast signal and/or broadcast associated information or a server that receives a previously generated broadcast signal and/or broadcast associated information and transmits to the mobile terminal 100. The broadcast associated information may mean information regarding a broadcast channel, a broadcast program, a broadcast service provider, and the like. The broadcast signal may include a TV broadcast signal, a radio broadcast signal and a data broadcast signal as well as a broadcast signal in a form that a data broadcast signal is coupled to the TV or radio broadcast signal.

The broadcast associated information may also be provided through a mobile communication network, and in this case, the broadcast associated information may be received by the mobile communication module 112. The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may receive a broadcast signal using various types of broadcast systems. In particular, the broadcast receiving module 111 may receive a digital broadcast signal using a digital broadcast system such as digital multimedia broadcasting-terrestrial (DMB-T), digital multimedia broadcasting-satellite (DMB-S), media forward link only (MediaFLO), digital video broadcast-handheld (DVB-H), integrated services digital broadcast-terrestrial (ISDB-T), and the like. The broadcast receiving module 111 is, of course, configured to be suitable for every broadcast system that provides a broadcast signal as well as the above-mentioned digital broadcast systems. Broadcast signals and/or broadcast associated information received via the broadcast receiving module 111 may be stored in a suitable device, such as a memory 160.

The mobile communication module 112 transmits and/or receives a radio signal to and/or from at least one of a base station, an external terminal and a server over a mobile communication network. In this exemplary embodiment, the radio signal may include a voice call signal, a video call signal and/or various types of data according to text and/or multimedia message transmission and/or reception.

The wireless Internet module 113 is a module for supporting wireless Internet access. The wireless Internet module 113 may be built-in or externally installed to the mobile terminal 100. In this exemplary embodiment, the wireless Internet module 113 may use a wireless Internet access technique including a Wireless LAN (WLAN), Wi-Fi, Wireless Broadband (Wibro), World Interoperability for Microwave Access (Wimax), High Speed Downlink Packet Access (HSDPA), and the like.

The short-range communication module 114 is a module for supporting a short-range communication. In this exemplary embodiment, it may be used a short-range communication technology including Bluetooth, Radio Frequency IDentification (RFID), Infrared Data Association (IrDA), Ultra WideBand (UWB), ZigBee, and the like.

The location information module 115 denotes a module for detecting or calculating a position of a mobile terminal. An example of the location information module 115 may include a Global Positioning System (GPS) module. The GPS module may receive position information in cooperation with associated multiple satellites. Here, the location information may include coordinates information represented by latitude and longitude. For example, the GPS module can measure accurate time and distance respectively from more than three satellites so as to accurately calculate a current position of the mobile terminal based on such three different distances according to a triangulation scheme. A scheme may be used to obtain time information and distance information from three satellites and correct error by one satellite. Specifically, the GPS module can further obtain three-dimensional speed information and an accurate time, as well as position on latitude, longitude and altitude, from the position information received from the satellites. Wi-Fi Positioning System and/or Hybrid Positioning System may be applied as the location information module 115.

The A/V input unit 120 is configured to provide audio or video signal input to the mobile terminal. The A/V input unit 120 may include a capturing unit 121 and a microphone 122. The capturing unit (camera) 121 receives and processes image frames of still pictures or video obtained by image sensors in a video call mode or a capturing mode. The processed image frames may be displayed on a display 151. The image frames processed by the capturing unit 121 may be stored in the memory 160 or transmitted to the exterior via the wireless communication unit 110.

In accordance with one exemplary embodiment of the present disclosure, the capturing unit 121 may include a lens (not shown) for capturing an object to be captured. Also, the capturing unit 121 may further include a plurality of lenses (not shown) for obtaining a left image of a left view and a right image of a right view of images for the object so as to capture a stereoscopic image for the object. Also, the capturing unit 121 may further include a lens (not shown) for obtaining an image of an intermediate view between the left view and the right view for the same object. Or, the capturing unit 121 may further include an image synthesizing unit (not shown) for obtaining a synthesized image of an intermediate view from the stereoscopic image including the left image and the right image.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may receive an input command applied to control an operation of the terminal, and transfer the received command to the controller 180 such that the controller 180 can operate in response to the command. The user input unit 130 may be configured by including a keypad, a dome switch, a touch pad (pressure/capacitance), a jog wheel, a jog switch, and the like. Especially, when the touch pad has an inter-layered structure with the display unit 151, this may be referred to as a touch screen.

In accordance with one exemplary embodiment of the present disclosure, the user input unit 130 may include a first shutter release input portion (not shown) and a second shutter release input portion (not shown). The first shutter release input portion (not shown) may receive a trigger signal for executing an autofocus operation. The second shutter release input portion (not shown) may receive a trigger signal for capturing an object. Preferably, the first shutter release input portion (not shown) and the second shutter release input portion (not shown) may be a keypad or a touch pad. Also, preferably, the first shutter release input portion (not shown) and the second shutter release input portion (not shown) may be a multi-touch type touch pad.

In accordance with one exemplary embodiment of the present disclosure, the user input unit 130 may allow a user to input an object capturing mode. The object capturing modes, for example, may include preset modes, such as landscape, figure and sports, which are classified according to characteristics (for example, speed) of objects. In the meantime, the capturing modes may further include a regular mode, an indoor mode, a night mode, a text (character, letter) mode, a backlight mode and the like. Also, the capturing modes may further include a manual mode in which the user is able to set the characteristic of movement of an object.

The sensing unit 140 (or other detection means) detects a current status (or state) of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, a haptic module 154 and the like.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication. When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display and the like. The display 151 may be implemented in two or more in number according to a configured aspect of the mobile terminal 100. For instance, the mobile terminal 100 may simultaneously be provided with an external display unit (not shown) and an internal display unit (not shown).

Meanwhile, when the display unit 151 and a sensor (referred to as a 'touch sensor', hereinafter) are overlaid in a layered manner (referred to as a 'touch screen', hereinafter), the display unit 151 may be used as both an input device and an output device. The touch sensor may have the form of, for example, a touch film, a touch sheet, a touch pad, etc.

The touch sensor may be configured to convert a pressure applied to a particular portion of the display unit 151 or a change in capacitance at a particular portion of the display unit 151 into an electrical input signal. The touch sensor may be configured to detect the pressure when a touch is applied, as well as a touched position or area. When a touch with respect to the touch sensor is inputted, corresponding signal (signals) are transmitted to a touch controller (not shown). The touch controller processes the signal (signals) and transmits corresponding data to the controller 180. Thus, the controller 180 can recognize which portion of the display unit 151 has been touched.

Hereinafter, a status that the pointer is positioned to be proximate onto the touch screen without contact will be referred to as 'proximity touch', whereas a status that the pointer substantially comes in contact with the touch screen will be referred to as 'contact touch'. When the pointer is positioned in a status of 'proximity touch,' the position corresponds to a position to be vertical with respect to the touch screen.

The proximity sensor 141 senses proximity touch, and proximity touch patterns (e.g., distance, direction, speed, time, position, moving status, etc.). Information relating to the sensed proximity touch, and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the mobile terminal 100, e.g., call signal reception sound, message reception sound, and so on. The audio output module 152 may include a speaker, a buzzer, and so on.

The alarm 153 outputs signals notifying occurrence of events from the mobile terminal 100. The events occurring from the mobile terminal 100 may include call signal reception, message reception, key signal input, touch input, and so on. The alarm 153 may output not only video or audio signals, but also other types of signals such as signals notifying occurrence of events, for example, in a vibration manner. When call signals or messages are received, the alarm 153 may implement the mobile terminal 100 to vibrate through a vibration means in order to notify the reception. When key signals are input, the alarm 153 may implement the mobile terminal 100 to vibrate through a vibration means as a feedback to the input. A user can recognize occurrence of events through the vibration of the mobile terminal 100. Signals notifying occurrence of events may be output through the display 151 or the audio output module 152.

The haptic module 154 generates various tactile effects that a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects including not only vibration, but also arrangement of pins vertically moving with respect to a skin surface contacting the haptic module 164, air injection force or air suction force through an injection hole or a suction hole, touch by a skin surface, presence or absence of contact with an electrode, effects by stimulus such as an electrostatic force, and reproduction of cold or hot feeling using a heat absorbing device or a heat emitting device.

The haptic module 154 may be configured to transmit tactile effects through a user's direct contact, or a user's muscular sense using a finger or a hand.

The memory 160 may include a read only memory (ROM) 161 for storing programs for operating the controller 180, for example, a flash memory, and a random access memory (RAM) 162 for storing input/output data or temporarily output data processed to be displayed.

The interface unit 170 interfaces the mobile terminal 100 with all external devices connected to the mobile terminal 100. The interface 170, for example, may include a wire/wireless headset port, an external charger port, a wire/wireless data port, a memory card port, a port to connect a device having an identification module to the mobile terminal 100, an audio Input/Output (I/O) port, a video Input/Output (I/O) port, an earphone port, and so on. Here, the identification module is implemented as a chip to store each kind of information to identify an authorization right for the mobile terminal 100, and may include a User Identity Module (UIM), a Subscriber Identity Module (SIM), a Universal Subscriber Identity Module (USIM), and so on. A device having the identification module (hereinafter, will be referred to as 'identification device') may be implemented as a smart card type. Accordingly, the recognition module may be connected to the mobile terminal 100 through a port. The interface unit 170 may be configured to receive data or power from an external device to transmit it to each component inside the mobile terminal 100, or may be configured to transmit data inside the mobile terminal 100 to an external device.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The power supply unit 190 may be configured to receive external or internal power and to supply the received power to each component of the mobile terminal 100 under control of the controller 180.

Figure 2:
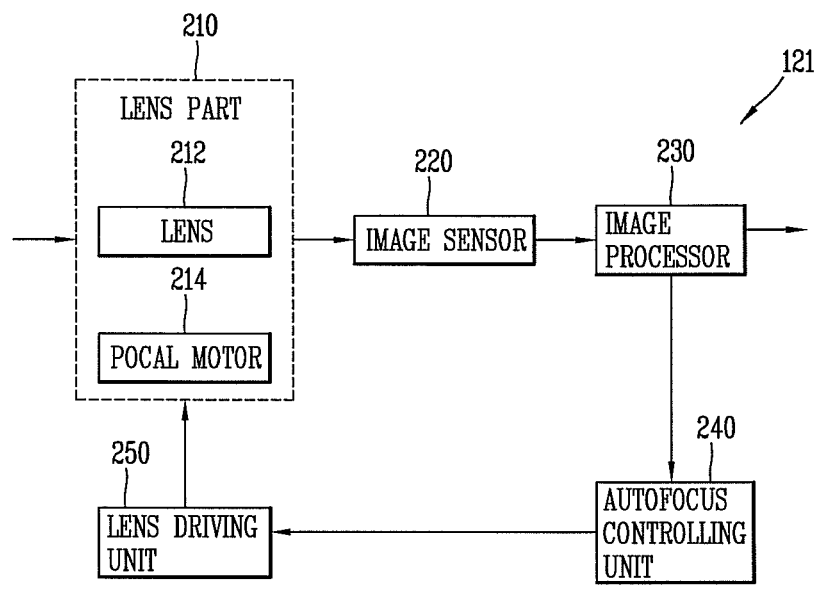
FIG. 2 is a detailed block diagram of a capturing unit 121 shown in FIG. 1.

FIG. 2 is a detailed block diagram of a capturing unit 121 shown in FIG. 1. In accordance with this exemplary embodiment, the capturing unit 121 may include a lens part 210, an image sensor 220, an image processor 230, an autofocus controlling unit 240, and a lens driving unit 250.

The lens part 210 may include a lens 212 for forming (capturing, imaging) an optical image of an object onto the image sensor 220, and a focal motor 214 for driving the lens 212 to a focal position in response to an input motor driving signal.

The image sensor 220 may photoelectrically change the optical image formed through the lens 212 using a charge coupled device (CCD) or a complementary metal oxide semiconductor (CMOS), thus outputting an electric signal.

The image processor 230 may process the electric signal output from the image sensor 220 to generate image data corresponding to a captured image of the object. Also, the image processor 230 may analyze image characteristic information from the generated image data. The image processor 230 may analyze lens steps, which are set according to a distance between the lens and the object and are units for moving a position of the lens, and focal values, each of which is converted into a numeral value from high frequency image signal information, for example, based on characteristic information (for example, sharpness information) relating to an image which is formed on an image sensor at each lens step.

The autofocus controlling unit 240 may calculate a position of the lens 212 based on a graph of focal values corresponding to the analysis result of the image characteristic information output by the image processor 230, generate a driving signal for driving the lens 212 of the lens part 210 to a corresponding position, and output the generated driving signal to the lens driving unit 250. The position of the lens 212 may be a position corresponding to an algorithm for reducing a lens step area or a position for obtaining the sharpest (clearest) image (or an in-focus image).

The lens driving unit 250 may move the lens 212 through a focal motor 214 in response to the driving signal output from the autofocus controlling unit 240. Accordingly, a spaced distance between the lens 212 and the image sensor 220 may change, thereby adjusting a focus on the optical image formed on the image sensor 220.

Figure 3:
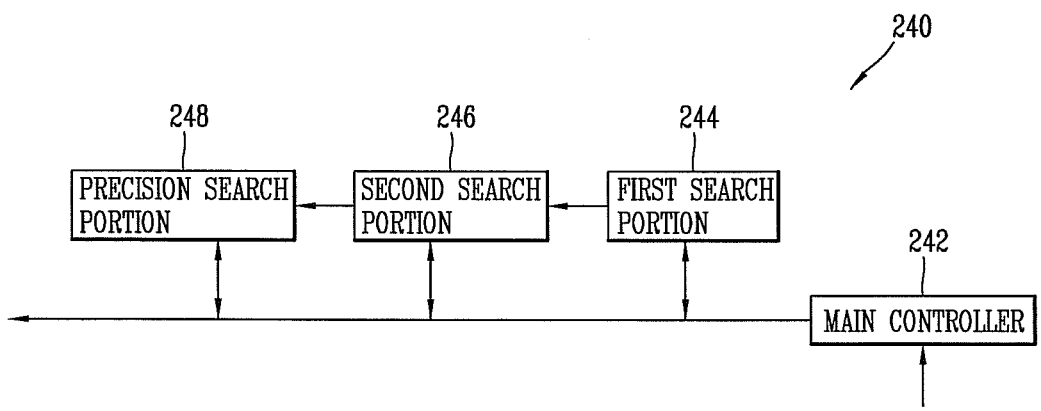
FIG. 3 is a detailed block diagram of an autofocus controlling unit 240 shown in FIG. 2.

FIG. 3 is a detailed block diagram of the autofocus controlling unit 240 shown in FIG. 2. The autofocus controlling unit 240 may include a main controller 242, a first search portion 244, a second search portion 246 and a precision search portion 248.

The main controller 242 may control operations of the first search portion 244, the second search portion 246 and the precision search portion 248. The main controller 242 may receive a capturing mode for an object, input via the user input unit 130, and determine an autofocus setting corresponding to the input capturing mode. The autofocus setting may depend on a capturing mode, and include a setting of increasing autofocus speed or a setting of increasing precision of the autofocus operation. In a sports mode for capturing a dynamic (moving) object, the autofocus setting may include values for fast executing the autofocus so as to increase the speed of the execution. In a landscape mode for capturing a static object, the autofocus setting may include values for precisely executing the autofocus so as to increase the precision of the execution.

The first search portion 244 may decide a predetermined range of area which includes a lens step with the highest (maximum) focal value in a lens step area set according to a distance between the lens 212 and an object. To this end, the first search portion 244 may calculate focal values for each of at least two lens steps of the entire lens step area. The entire lens step area is divided into at least three areas by the at least two lens steps. Also, the first search portion 244 may decide an area (hereinafter, referred to as a first area) including a lens step with the highest focal value of focal values of the lens steps corresponding to boundaries of the divided at least three areas.

Preferably, the first search portion 244 may divide the lens steps into a number of areas corresponding to an autofocus setting. For example, the number of areas divided in the sports mode may be 3, and the number of areas divided in the landscape mode may be 10. Also, the first search portion 244 may decide the first area including the lens step with the highest focal value among the divided areas. Here, the first search portion 244 may compare focal values which correspond to at least one lens step included in each of the divided areas, and decide the first area based on the comparison result.

According to the result of the operation of the first search portion 244, a range for searching for the lens step having the highest focal value may be reduced. The first search portion 244 may output, to the second search portion 246, information relating to the decided first area, for example, information relating to lens steps corresponding to a start point and an end point of the first area and calculated focal values corresponding to the lens steps.

The second search portion 246 may receive the information relating to the first area from the first search portion 244. The second search portion 246 may then decide an area (hereinafter, referred to as a second area), which is reduced by a threshold value set by an experiment for minimizing the size of the corresponding area with still including the lens step with the highest focal value among areas (lens steps) included in the first area. The threshold value may be decided by an experiment for deciding the first area based on simulation data captured according to various distances between the lens 212 and the object and deciding the highest ratio, at which a reduced area eventually includes the highest focal value as it is, while reducing the decided first area according to a predetermined ratio. As one example, the threshold value may be a predetermined angle or an inclination (tilt).

Preferably, the second search portion 246 may check a threshold value corresponding to an autofocus setting. Here, the threshold value corresponding to the autofocus setting may be decided based on simulation data. When the second area is experimentally decided from the first area according to a threshold value, the threshold value may be decided according to the probability that the second area has the highest focal value. For example, when a capturing mode is a sports mode, the threshold value may be a value which allows the second area to have the highest focal value with 70% chance. When the capturing mode is a landscape mode, the threshold value may be a value which allows the second area to have the highest focal value with 90% chance.

According to the result of the operation of the second search portion 246, the range for searching for the lens step with the highest focal value may be further reduced. The second search portion 246 may output to the precision search portion 248 information relating to the decided second area, for example, information relating to lens steps corresponding to boundaries of is the second area and focal values calculated with respect to the lens steps.

The precision search portion 248 may decide a lens step with the highest focal value of the lens steps included in the second area. To this end, the precision search portion 248 may output a driving signal to the lens driving unit 250 to move the lens 212 by lens steps in a sequential or non-sequential manner. The precision search portion 248 may then decide the lens step with the highest focal value based on analysis information relating to an image generated from the image processor 230.

The operation of the precision search portion 248 and the operation of the second search portion 246 may be associated with each other. That is, the threshold value may differ according to a method by which the precision search portion 248 decides the lens step having the highest focal value within the second area. As one example, a lens step and a corresponding focal value may satisfy a quadratic function near a lens step having the highest focal value. Here, the threshold value may be a value set by an experiment such that the second area can be an area satisfying the quadratic function. Here, the precision search portion 248 may decide the lens step with the highest focal value within the second area based on lens steps corresponding to the boundaries of the second area, a lens step corresponding to the center of the second area, and focal values corresponding to those lens steps.

After the precision search portion 248 decides the lens step having the highest focal value, the object may be captured via the lens 212 in response to a user input and an image generated by the capturing may be stored in the memory 160.

Figure 4:
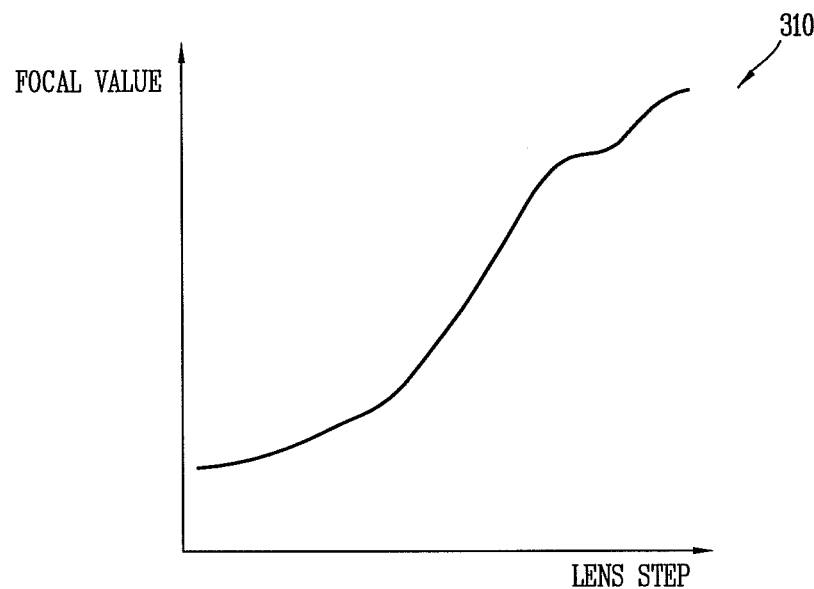
FIGS. 4 to 6 are graphs each illustrating a focal value corresponding to a lens step in accordance with one exemplary embodiment.
Figure 5:
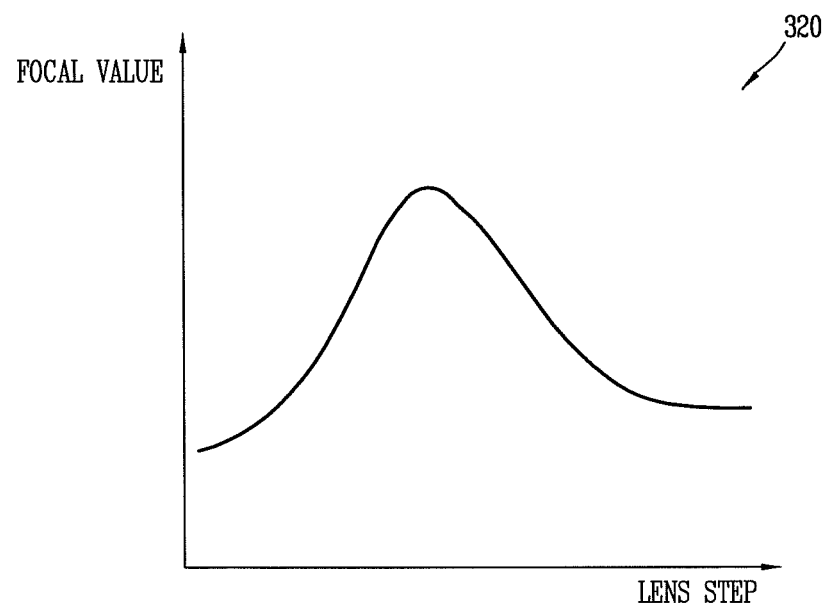
Figure 6:
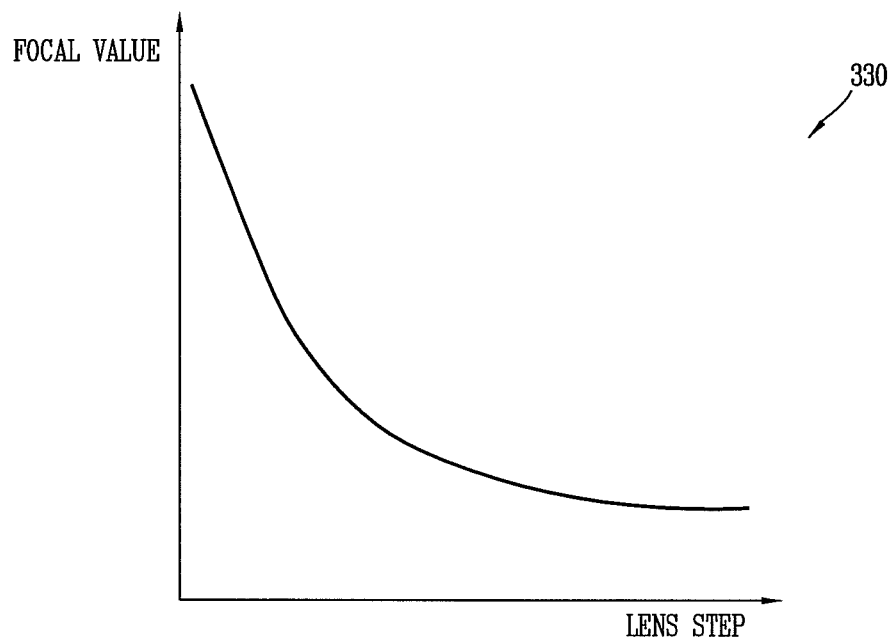

FIGS. 4 to 6 are graphs each illustrating a focal value corresponding to a lens step in accordance with one exemplary embodiment. In general, representing a focal value corresponding to a lens step in the form of graph, the graph has three forms shown in FIGS. 4 to 6.

First, FIG. 4 shows a case that an object is located at a close distance from the capturing unit 121. Here, a focal value may slowly increase in response to an increase in a lens step, as shown in FIG. 4, and become the highest value when being close to a position with the largest lens step. Therefore, the lens steps and the corresponding focal values may have a gradually increasing form as shown in a graph 310.

FIG. 5 shows a case that an object is located at an intermediate distance from the capturing unit 121. Here, a focal value may drastically increase in response to an increase in a lens step, and become the highest value near the central portion of the lens steps. Also, the focal value may gradually decrease after the lens step corresponding to the highest focal value. Therefore, the lens steps and the corresponding focal values, as shown in a graph 320, may have the form of drastically increasing up to the lens step having the highest focal value and then gradually decreasing.

FIG. 6 shows a case that an object is located far away from the capturing unit 121. Here, as shown in FIG. 6, the highest focal value may be formed near an initial lens step and then the focal value may drastically decrease in response to an increase in a lens step. Therefore, the lens steps and the corresponding focal values may have the form of gradually decreasing as shown in a graph 330.

Referring to FIGS. 4 to 6, a series of patterns can be noticed in relation to the lens step having the highest focal value. As one example, when focal values are calculated in an ascending order of lens steps, a focal value may first decrease at the lens step having the highest focal value or continuously increase to be the highest at the last lens step. Also, lens steps and corresponding focal values may meet a quadratic function in areas close to the lens step having the highest focal value.

Therefore, a lens step area may be divided. A first area corresponding to a lens step which is estimated to have the highest focal value may be decided among the divided areas according to a capturing mode. Afterwards, a second area, which is included in the first area, and is reduced from the first area by a threshold value set by an experiment (also, the threshold value may be set to meet a predetermined condition such as the quadratic function) with including the lens step having the highest focal value as it is, may be decided. Eventually, the lens step area for executing an autofocus operation may be reduced. This may allow for a fast or precise decision of the lens step having the highest focal value.

Figure 7:
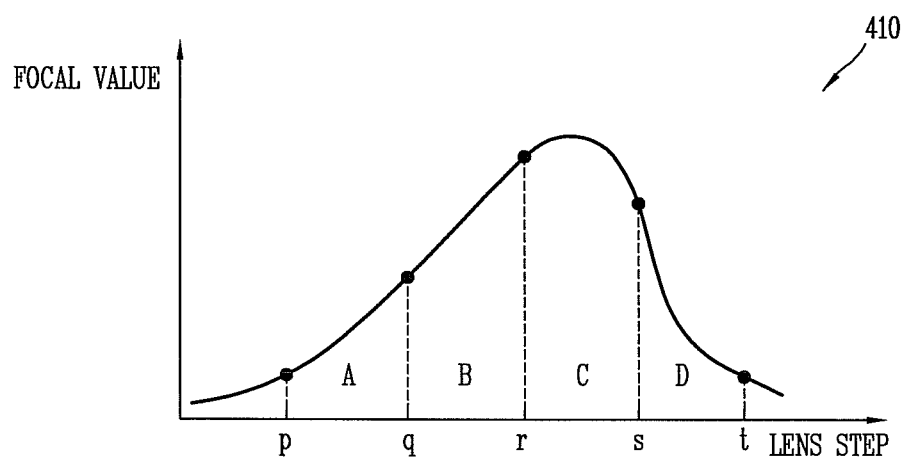
FIG. 7 is a view illustrating an operation of a first search portion 244 in accordance with the one exemplary embodiment.

FIG. 7 is a view illustrating an operation of the first search portion 244 in accordance with the one exemplary embodiment. FIG. 7 exemplarily illustrates that an initial lens step area is divided into four areas, but the one exemplary embodiment of the present disclosure may be applicable to any case where the area is divided into at least three in a natural number.

The first search portion 244 may divide the lens step area into a plurality of areas, and decide a first area which is estimated to have a lens step corresponding to the highest focal value among the divided areas. Graphs representing lens steps and corresponding focal values have the forms shown in FIGS. 4 to 6. Therefore, an area which includes a lens step from which the focal value starts to decrease or an area which includes lens steps corresponding to both boundaries may include the lens step which is estimated to have the highest focal value.

First, the first search portion 244 may read out a division number N (N is a natural number after 3) for a lens step area, which is preset according to an autofocus setting corresponding to a capturing mode, from the memory 160. Also, preferably, the division number of the lens step area may be received through the user input unit 130 or the wireless communication unit 110.

The first search portion 244 may set N−1 lens steps (hereinafter, referred to as pivots), which are included in each area, for example, correspond to boundaries of a lens step, according to the division number of the lens step area read out of the memory 160 or received through the user input unit 130 or the wireless communication unit 110. For example, when total 100 lens steps are divided into four areas A, B, C and D, three pivots corresponding to $25^{th}$, $50^{th}$ and $75^{th}$ lens steps q, r and s may be set.

FIG. 7 exemplarily illustrates the lens steps corresponding to the boundaries between the divided areas are set as the pivots. However, any lens step included in each of the divided area may be set as the pivot. For example, a lens step corresponding to a center of each divided area may be set as the pivot.

The first search portion 244 may select two adjacent pivots from the set pivots, calculate focal values corresponding to the selected pivots and compare the calculated focal values. For example, focal values corresponding to the pivot q and the pivot r in a graph 410 are compared with each other. However, it may also be available to first compare focal values corresponding to the pivot r and the pivot s.

The first search portion 244 may set as the next comparing targets a pivot corresponding to the higher focal value of the compared two focal values and another pivot adjacent to the pivot. For example, the pivot r corresponding to the higher focal value of the focal values (q and r) and the adjacent pivot s are set as the next comparing targets. However, when the focal values corresponding to the pivot r and the pivot s are first compared to each other, the pivot r corresponding to the higher focal value of the focal values (r and s) and the adjacent pivot q may be set as the next comparing targets. That is, the first search portion 244 may set the next comparing targets in an ascending order or a descending order of sizes of lens steps.

According to such method, the first search portion 244 may search for a lens step area including the first lens step from which the focal value starts to decrease (namely, a variation (a quantity of change) of the focal value starts to be minus). For example, the pivot r corresponding to the higher focal value of the focal values in the graph 410 has no adjacent pivot any more because the focal value of the pivot q adjacent to it has already been examined. Therefore, a lens step having the highest focal value, namely, capable of generating the sharpest image may be estimated to be present within the lens step areas B and C between the pivot q and the pivot r (or a lens step area adjacent to the pivot q just before the last calculated pivot r).

In the meantime, unlike the embodiment of FIG. 7, when the focal value corresponding to the pivot q is lower than the focal value corresponding to the pivot r, any other pivot adjacent to the pivot q may not exist. Here, the lens step p corresponding to a left boundary as one of both boundaries of the lens step area is adjacent to the pivot q, accordingly, the focal value corresponding to the pivot q may be compared with a focal value of the lens step p corresponding to the left boundary. This may be similarly applied to the pivot r adjacent to a lens step t corresponding to a right boundary.

Also, when it is determined that the focal value corresponding to one lens step p or r of the both boundaries is higher than the focal value corresponding to the adjacent pivot q or s, a first area, which is estimated to include a lens step with the highest focal value, namely, a lens step capable of generating the sharpest image, may be one area A or D including the corresponding boundary, unlike the embodiment of FIG. 7.

According to such method, the first search portion 244 may divide the lens step area into N areas according to a capturing mode, and decide an area including a lens step, which is estimated to have the highest focal value, among the divided areas. In FIG. 7, the first search portion 244 may decide the areas B and C (i.e., first area), which are estimated to have the highest focal value, by calculating focal values of only the three pivots q, r and s. The first search portion 244 may then output information relating to the decided first area (B and C) to the second search portion 246.

Figure 8:
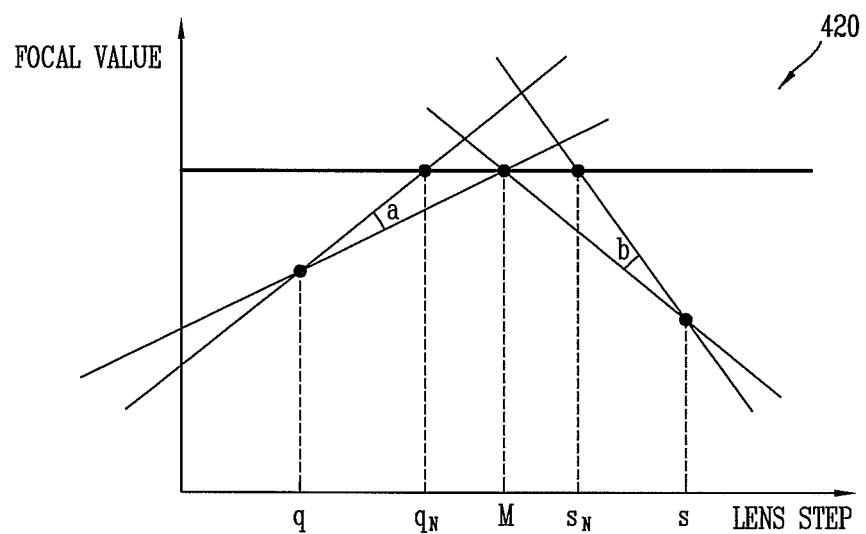
FIG. 8 is a view illustrating an operation of a second search portion 246 in accordance with the one exemplary embodiment.

FIG. 8 is a view illustrating an operation of the second search portion 246 in accordance with the one exemplary embodiment.

The second search portion 246 may receive the information relating to the first area from the first search portion 244, and decide a second area, which includes a lens step with the highest focal value of the focal values corresponding to the lens steps included in the first area, according to an autofocus setting corresponding to the capturing mode. Preferably, the second area may be an area in which lens steps included in the second area and the corresponding focal values meet a quadratic function.

First, the second search portion 246 may read out information relating to a threshold value, which has been set by an experiment, from the memory 160 in order to decide the second area from the first area. The second search portion 246 may decide the second area based on the information relating to the first area received from the first search portion 244 and information relating to a predetermined angle or inclination read out of the memory 160.

For example, in the state that the first search portion 244 has decided the area between the pivot q corresponding to the start point and the pivot s corresponding to the end point as the first area, the second search portion 246 may receive information relating to the pivots q and s and the focal values corresponding to the pivots q and s from the first search portion 244.

The second search portion 246 may check a lens step corresponding to the center of the first area and a focal value corresponding to the lens step. Referring to FIG. 7, the lens step r corresponding to the center of the first area (B and C) and the corresponding focal value have already been calculated by the first search portion 244, accordingly, the second search portion 246 may use the calculation results by the first search portion 244 as they are.

The second search portion 246 may then decide a pivot $q_N$ corresponding to the first boundary of the second area based on information relating to coordinates of the focal value corresponding to one (q) of the pivots q and s included in the first area, information relating to coordinates of a focal value corresponding to a lens step M corresponding to the center of the pivots q and s, and information relating to a threshold value read out of the memory 160.

For example, the second search portion 246 may calculate an inclination of a straight line which passes over the coordinates of the focal value corresponding to the one (q) of the pivots q and s included in the first area and the coordinates of the focal value corresponding to the lens step M corresponding to the center of the pivots q and s, and increase an angle of the inclination by a threshold value a. The second search portion 246 may decide as a left boundary of the second area a lens step $q_N$ of coordinates, on which the focal value corresponds to the lens step M corresponding to the center of the pivots, on the line, which passes the coordinates of the focal value corresponding to the one (q) of the pivots q and s included in the first area and has the angle of inclination increased by the threshold value a.

According to the same method, the second search portion 246 may decide a pivot $s_N$ corresponding to a right boundary of the second area based on information relating to coordinates of the focal value corresponding to one (s) of the pivots q and s included in the first area, information relating to coordinates of the focal value corresponding to the lens step M corresponding to the center of the pivots q and s, and information relating to a threshold value read out of the memory 160.

In the meantime, unlike this, only one of the two boundaries included in the second area may be calculated when the decided first area is only one area (for example, A or D in FIG. 7). For example, when the first area is decided as an area between the pivot q and the pivot M, an inclination only of the straight line passing coordinates corresponding to the focal values corresponding to the pivots q and M may increase by the threshold value a, and only the pivot $q_N$ corresponding to the left boundary of the second area may be calculated. Here, the second boundary of the second area may be the pivot M.

Here, a threshold value may be a fixed value such as a constant. Also, the threshold value may be equally applied to the start point and the end point of the first area. For example, the same threshold value a may be applied to both the start point and the end point of the first area. Also, the threshold value may be differently applied to the start point and the end point of the first area. For example, the threshold value a may be applied to the start point of the first area, and a threshold value b may be applied to the end point of the first area. Also, the threshold value may be differently applied according to focal values corresponding to the start point and the end point of the first area. For example, threshold values may be applied to the start point and the end point of the first area with reference to a table which includes information relating to the focal values corresponding to the start point and the end point of the first area and threshold values corresponding to the focal values. Also, the threshold value may be differently applied according to a ratio of focal values corresponding to the start point and the end point of the first area.

The second search portion 246 may output information relating to the decided second area to the precision search portion 248.

Figure 9:
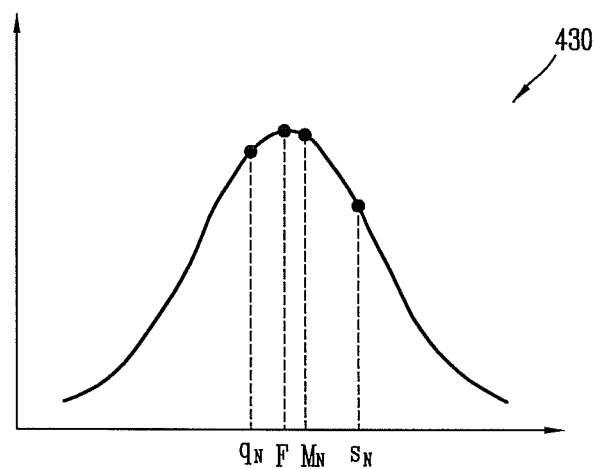
FIG. 9 is a view illustrating an operation of a precision search portion 248 in accordance with the one exemplary embodiment.

FIG. 9 is a view illustrating an operation of the precision search portion 248 in accordance with the one exemplary embodiment.

The precision search portion 248 may receive the information relating to the second area from the second search portion 246, and execute an autofocus (AF) operation with respect to the second area according to various methods. That is, the precision search portion 248 may calculate a lens step having the highest focal value in the second area. Preferably, the precision search portion 248 may execute the autofocus function according to one of a global search, a trend prediction approach, a rule based AF, a training-based method, a focal value training-based AF and a blur training-based method, based on an autofocus setting corresponding to a capturing mode.

The global search is also called a hill-climbing search (HCS). According to this method, a lens step increases by 1 (one) and a focal value for every lens step is obtained to decide a lens step having the highest focal value.

The trend prediction approach is a method of deciding a lens step having the highest focal value in a manner of predicting a trend by obtaining four focal values and applying the four focal values to a discrete differential equation prediction model (DDEPM).

The rule-based AF is a method of first determining whether or not there is a lens step having the highest focal value within an initial section, and deciding a lens step having the highest focal value in a manner of allocating a different search mode to each section according to an increase rate of the focal value.

The training-based method is a method of measuring a focal value based on images captured at various lens steps, and deciding a lens step having the highest focal value based on training data.

The focal value training-based AF is a method of selecting a characteristic vector based on focal values corresponding to several lens steps, and deciding a lens step having the highest focal value based on the selected characteristic vector.

The blur training-based method is a method of deciding a lens step having the highest focal value based on a blur characteristic trained using a predetermined camera parameter.

The precision search portion 248 may carry out an autofocus for the second area according to those various methods. The second area has considerably been reduced as compared with an initial lens step area. This may allow the precision search portion 248 to carry out the autofocus operation at improved speed.

As one example, the precision search portion 248 may carry out the autofocus operation using a quadratic function. The precision search portion 248 may decide the lens step with the highest focal value based on coordinates information relating to focal values corresponding to pivots corresponding to a start point and an end point of the second area and a pivot corresponding to the center thereof.

In a graph 430 of FIG. 9, when the second area is decided as an area between the pivots $q_N$ and $s_N$, the precision search portion 248 may receive information relating to each pivot $q_N$ and $s_N$ and the corresponding focal values from the second search portion 246. Also, the precision search portion 248 may calculate a pivot $M_N$ corresponding to the center of the pivots $q_N$ and $s_N$ and the corresponding focal value. Since the quadratic function provides information relating to the three coordinates, an equation for the graph may be obtained, and the obtained equation is as the following Equation 1.

$$y = ax^2 + bx + c \qquad \text{[Equation 1]}$$

In the meantime, when the quadratic function provides a curve equation, an x coordinate having the highest y value may be decided as expressed by the following Equation 2.

$$x = -\frac{b}{2a} \qquad \text{[Equation 2]}$$

When a lens step F with the highest focal value is decided by the precision search portion 248, the main controller 242 may transmit a driving signal for moving the lens 212 to the lens step F to the lens driving unit 250. The lens driving unit 250 may then move the lens 212 to the lens step F by use of the focal motor 214, thereby capturing an object through the lens 212.

FIGS. 10 to 15 are views each illustrating a setting screen for executing an autofocus operation in accordance with one exemplary embodiment.

Figure 10:
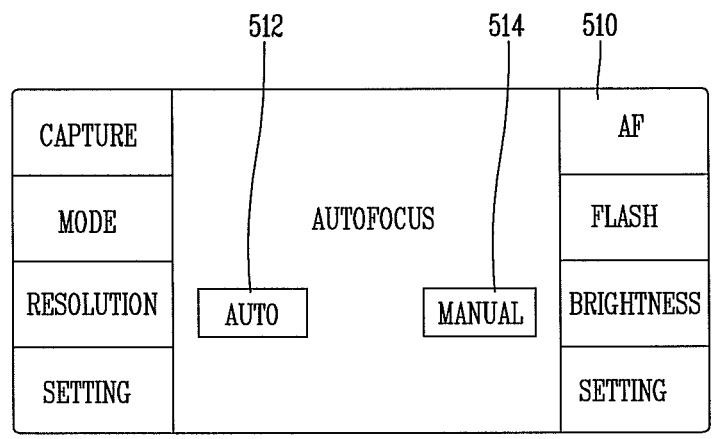
FIGS. 10 to 15 are views each illustrating a setting screen for executing an autofocus operation in accordance with the one exemplary embodiment.

As shown in a setting screen of FIG. 10, when an autofocus item 510 is selected, an AUTO item 512 for automatically setting an autofocus and a manual item 514 for manual setting of the autofocus may be output on the setting screen.

Figure 11:
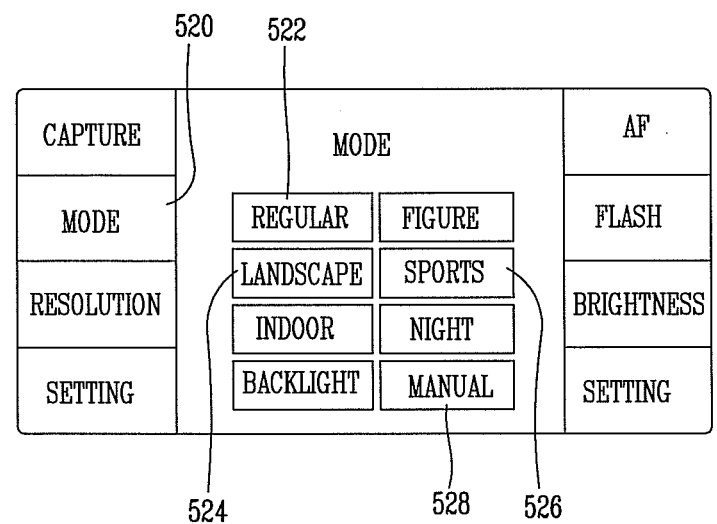

In a setting screen shown in FIG. 11, when a capturing mode item 520 is selected, various capturing mode items may be displayed. An area division number of the first search portion 244, information relating to a threshold value of the second search portion 246 and information relating to a precision search method of the precision search portion 248 may be preset according to each item. For example, when a landscape item 524 is selected, a large area division number and a method providing high precision of the precision search methods may be selected, as compared with the selection of a regular item 522. Accordingly, a threshold value may be automatically decided. On the contrary, when a sports item 526 is selected, a small area division number and a method providing high speed of the precision search methods may be selected, as compared with the selection of the regular item 522. Accordingly, a threshold value may be automatically decided.

In the setting screen of FIG. 11, when a manual item 528 is selected, details for capturing an object may be set. When an AF tap item 532 is selected on a detail setting screen of FIG. 12, an area division number item 534, a threshold value item 536 and a precision search method item 538 may be displayed.

Figure 12:
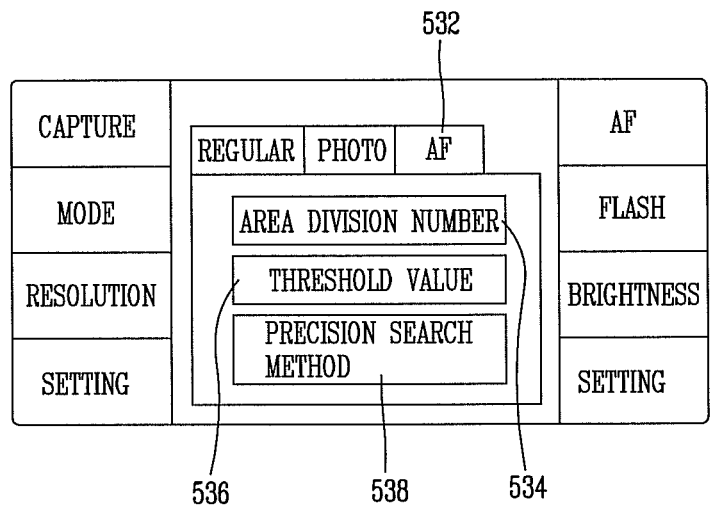
Figure 13:
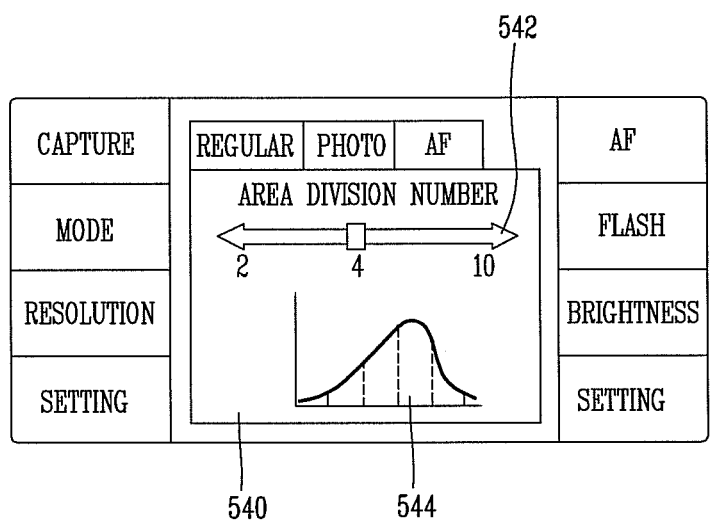

In the detail setting screen of FIG. 12, when the area division number item 534 is selected, a screen 540 for setting the area division number may be displayed as shown in a setting screen of FIG. 13. the screen 540 for setting the area division number may include user interfaces for inputting the area division number, for example, a bar 542 for adjusting the number and an area 544 for outputting brief information, such as a graph, relating to decision of a first area according to the adjusted area division number.

Figure 14:
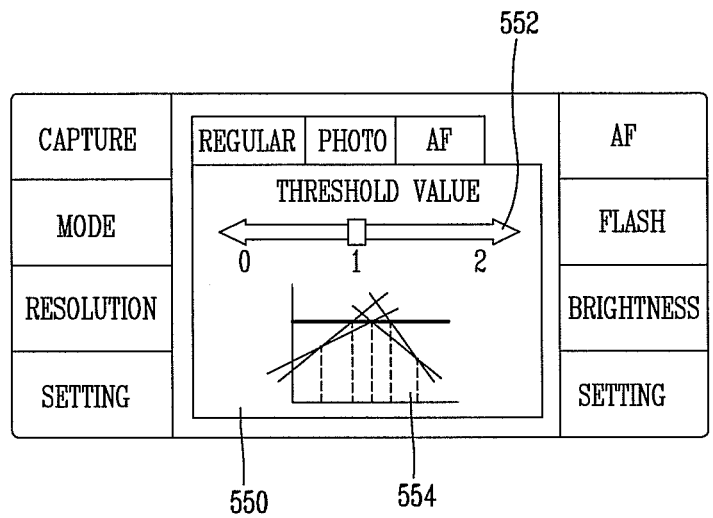

In the detail setting screen of FIG. 12, when the threshold value item 536 is selected, a screen 550 for setting a threshold value may be displayed as shown in a setting screen of FIG. 14. The screen for setting the threshold value may include user interfaces for inputting the threshold value, for example, a bar 552 for adjusting a number, and an area 554 for outputting brief information, such as a graph, relating to decision of a second area according to the adjusted threshold value.

Figure 15:
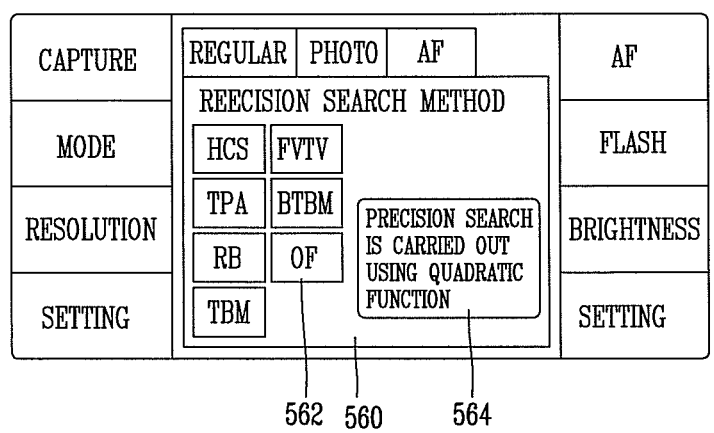

In the detail setting screen of FIG. 12, when the precision search method item 538 is selected, a screen 560 for setting a precision search method may be displayed as shown in a setting screen of FIG. 15. The screen 560 for setting the precision search method may include items associated with various methods, such as HCS and the like, for executing an autofocus. The screen 560 may thus display detailed information 564 relating to the selected item 562.

Figure 16:
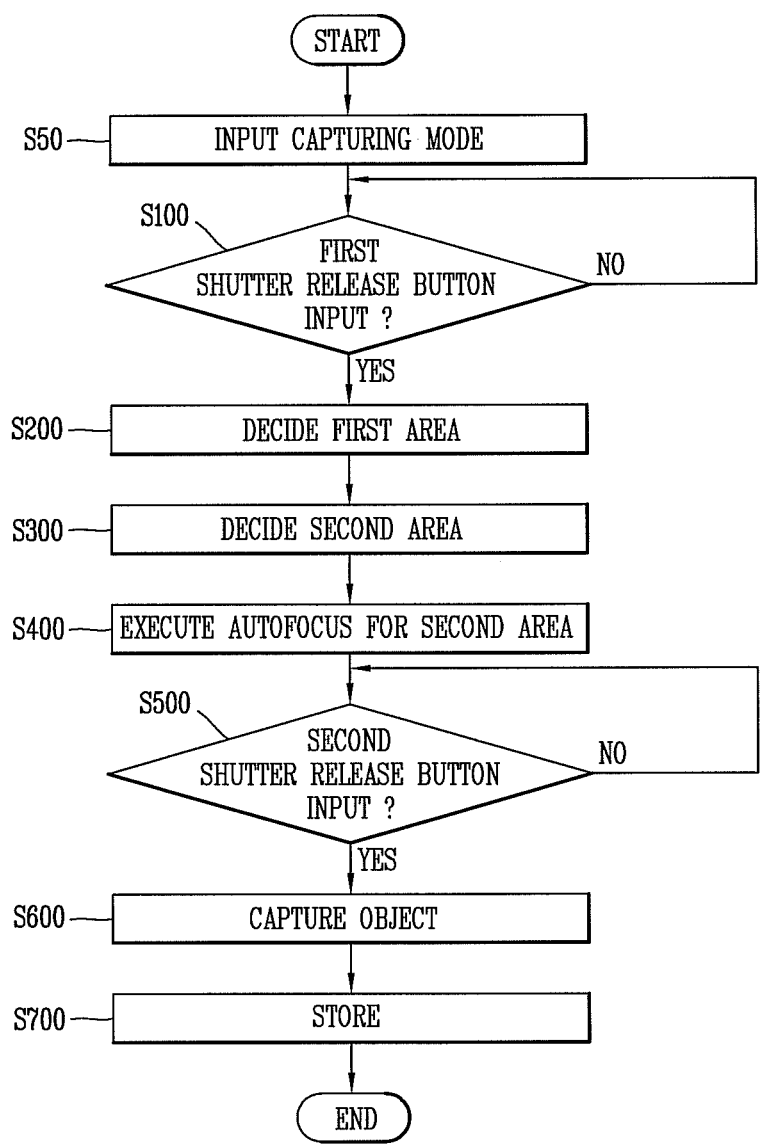
FIG. 16 is a flowchart illustrating a process of executing an autofocus operation in accordance with one exemplary embodiment.

FIG. 16 is a flowchart illustrating a process of executing an autofocus operation in accordance with one exemplary embodiment. A main controller 242 may receive a capturing mode input via a user input unit 130, and check an autofocus setting corresponding to the input capturing mode (S50). Also, the main controller 242 may monitor whether or not an autofocus trigger signal is received through a first shutter release input portion (S100).

Upon reception of the autofocus trigger signal at the step S100, a first search portion 244 may divide a lens step area into a plurality of areas according to the autofocus setting, and decide an area which is estimated to include a lens step corresponding to the highest focal value among the divided areas (S200).

A second search portion 246 may receive information relating to the area (first area) which is estimated to include the lens step having the highest lens step from the first search portion 244, and then select a second area, which meets a predetermined condition such that a precision search portion 248 can carry out the autofocus operation, from the lens step areas included in the first area, according to the autofocus setting corresponding to the capturing mode (S300).

The precision search portion 248 may receive information relating to the second area from the second search portion 246, and carry out the autofocus according to the autofocus setting corresponding to the capturing mode (S400). Eventually, a lens driving unit 250 may control a focal motor 214 according to a driving signal of an autofocus controlling unit 240, thereby moving a lens 212 to the lens step having the highest focal value.

The main controller 242 may monitor whether or not an object capturing trigger signal is received through the second shutter release input portion (S500).

Upon reception of the object capturing trigger signal at the step S500, the lens 212 may form (image) an optical image of the object on an image sensor 220. The image sensor 220 may photoelectrically change the formed optical image so as to output an electric signal. Here, an image processor 340 may process the electric signal output from the image sensor 220, generating image data corresponding to the captured image of the object (S600).

The memory 160 may store the generated image data (S700).

The mobile terminal described in this specification may include every terminal capable of transmitting or receiving text messages. Examples of the terminals may include a cellular phone, a smart phone, a laptop computer, a digital broadcasting terminal, a personal digital assistants (PDA), a portable multimedia player (PMP), a navigator and the like.

The present disclosure may not be limited to the configuration and method of the illustrated exemplary embodiments, but each embodiment may be selectively combined all or partially to implement various changes and modifications of the exemplary embodiments.

Here, terminologies used in this specification and claims should not be construed with being limited to typical meaning or dictionary definitions, but interpreted as meaning and concepts that fall within the scope of the present disclosure.

Therefore, the configurations shown in the embodiments and drawings of the present disclosure are merely illustrative and not provide every technical scopes of the present disclosure. Hence, it should be understood that various equivalents and variations to replace them can be present at the time point of filing the present disclosure.

The invention claimed is:

1. An autofocus method comprising:
   selecting a capturing mode among a plurality of capturing modes classified according to a characteristic of movement of an object;
   determining an autofocus setting corresponding to the selected capturing mode;
   deciding a lens step with the highest focal value among lens steps based on the determined autofocus setting, the lens steps being set according to a distance between a lens and the object; and
   moving the lens to the decided lens step.

2. The method of claim 1, wherein the deciding of the lens step having the highest focal value among the lens steps comprises:
   dividing the lens steps into the number of areas corresponding to the determined autofocus setting;
   deciding a first area including the lens step with the highest focal value among the divided areas; and
   deciding the lens step with the highest focal value in the first area.

3. The method of claim 2, wherein the deciding of the first area comprises:
   comparing focal values corresponding to at least one lens step included in each of the divided areas; and
   deciding the first area based on the comparison result.

4. The method of claim 2, wherein the deciding of the lens step with the highest focal value within the first area comprises:
   checking a threshold value corresponding to the determined autofocus setting;
   deciding a second area including the lens step with the highest focal value within the first area based on the threshold value; and
   deciding a lens step with the highest focal value within the second area.

5. The method of claim 4, wherein the deciding of the lens step with the highest focal value within the second area is a step of deciding the lens step having the highest focal value using one of a global search, a trend prediction approach, a rule based AF, a training-based method, a focal value training-based AF and a blur training-based method, based on the determined autofocus setting.

6. The method of claim 4, wherein the threshold value is a preset value such that the lens steps included in the second area and focal values corresponding to the lens steps included in the second area meet a quadratic function.

7. The method of claim 4, wherein the threshold value is a constant.

8. The method of claim 4, wherein the threshold value is a predetermined angle or inclination.

9. The method of claim 1, further comprising, prior to determining of the autofocus setting, receiving an autofocus trigger signal.

10. An autofocus device comprising:
- an input unit to receive a user input for selecting a capturing mode among a plurality of capturing modes classified according to a characteristic of movement of an object;
- a setting controller to determine an autofocus setting corresponding to the selected capturing mode;
- an autofocus controlling unit to decide a lens step with the highest focal value among lens steps based on the determined autofocus setting, the lens steps being set according to a distance between a lens and the object; and
- a lens controller is to move the lens to the decided lens step.

11. The device of claim 10, wherein the autofocus controlling unit divides the lens steps into the number of areas corresponding to the determined autofocus setting, decides a first area including a lens step with the highest focal value among the divided areas, and decides a lens step with the highest focal value within the first area.

12. The device of claim 11, wherein the autofocus controlling unit compares focal values corresponding to at least one lens step included in each of the divided areas, and decides the first area based on the comparison result.

13. The device of claim 11, wherein the autofocus controlling unit checks the threshold value corresponding to the determined autofocus setting, decides a second area including a lens step with the highest foal value within the first area based on the threshold value, and decides a lens step having the highest focal value within the second area.

14. The device of claim 13, wherein the autofocus controlling unit decides the lens step with the highest focal value using one of a global search, a trend prediction approach, a rule based AF, a training-based method, a focal value training-based AF and a blur training-based method, based on the determined autofocus setting.

15. The device of claim 13, wherein the threshold value is a preset value such that the lens steps included in the second area and focal values corresponding to the lens steps included in the second area meet a quadratic function.

16. The device of claim 13, wherein the threshold value is a constant.

17. The device of claim 13, wherein the threshold value is a predetermined angle or inclination.

18. The device of claim 10, wherein the input unit receives an autofocus trigger signal.

19. The method of claim 1, wherein the capturing mode is classified according to a characteristic of movement of an object, and the autofocus setting comprises execution speed or precision of the autofocus.

20. The device of claim 10, wherein the capturing mode is classified according to a characteristic of movement of an object, and the autofocus setting comprises execution speed or precision of the autofocus.

* * * * *